United States Patent
Walker

(10) Patent No.: US 11,038,334 B2
(45) Date of Patent: Jun. 15, 2021

(54) AIRCRAFT WING COMPOSITE RIBS HAVING ELECTRICAL GROUNDING PATHS

(71) Applicant: The Boeing Company, Chicago, IL (US)

(72) Inventor: Steven Paul Walker, Arlington, WA (US)

(73) Assignee: THE BOEING COMPANY, Chicago, IL (US)

( * ) Notice: Subject to any disclaimer, the term of this patent is extended or adjusted under 35 U.S.C. 154(b) by 411 days.

(21) Appl. No.: 16/247,201

(22) Filed: Jan. 14, 2019

(65) Prior Publication Data

US 2020/0227905 A1 Jul. 16, 2020

(51) Int. Cl.
*H02G 13/00* (2006.01)
*B64C 3/18* (2006.01)
*H01R 4/30* (2006.01)

(52) U.S. Cl.
CPC .............. *H02G 13/80* (2013.01); *B64C 3/187* (2013.01); *H01R 4/308* (2013.01)

(58) Field of Classification Search
CPC ........... B64C 3/187; B64C 3/185; B64C 3/56; B64C 33/02; B64C 3/00; B64C 1/26; H02G 13/80

See application file for complete search history.

(56) References Cited

U.S. PATENT DOCUMENTS

| 5,454,895 | A | * | 10/1995 | Imparato | ............... | B29C 70/342 |
| | | | | | | 156/156 |
| 5,865,397 | A | * | 2/1999 | Herrmann | ............... | B64D 45/02 |
| | | | | | | 244/14 |
| 7,784,734 | B2 | | 8/2010 | Christman | | |
| 9,156,538 | B1 | * | 10/2015 | Stern | ..................... | F16B 37/041 |

(Continued)

FOREIGN PATENT DOCUMENTS

| EP | 1942052 | | 7/2008 | | |
| EP | 1942052 | A1 * | 7/2008 | ............... | B64C 3/26 |
| FR | 2914622 | | 10/2008 | | |

OTHER PUBLICATIONS

European Patent Office, "Extended European Search Report," issued in connection with European Patent Application No. 20151064.1, dated Jun. 8, 2020, 5 pages.

(Continued)

*Primary Examiner* — William H. Mayo, III
*Assistant Examiner* — Krystal Robinson
(74) *Attorney, Agent, or Firm* — Hanley, Flight & Zimmerman, LLC

(57) ABSTRACT

Aircraft wing composite ribs having electrical grounding paths are described. An example composite rib includes a carbon fiber reinforced plastic (CFRP) panel, a metallic rib post, a metallic fitting, and a metallic grounding member. The metallic rib post is coupled to the CFRP panel and configured to be coupled to a spar of an aircraft wing, the spar being coupled to a current return network (CRN) cable.

(Continued)

The metallic fitting is coupled to the CFRP panel and configured to be coupled to a skin panel of the aircraft wing. The metallic grounding member is positioned between the CFRP panel and the metallic fitting. The metallic grounding member provides an electrical grounding path extending from the metallic fitting to the metallic rib post.

22 Claims, 7 Drawing Sheets

(56) References Cited

U.S. PATENT DOCUMENTS

| | | | | |
|---|---|---|---|---|
| 10,246,181 | B2* | 4/2019 | Witte | B64C 23/069 |
| 10,449,733 | B2* | 10/2019 | Iagulli | B29C 70/345 |
| 10,710,321 | B2* | 7/2020 | Datta | B29D 99/0028 |
| 2003/0192990 | A1* | 10/2003 | Simpson | B29C 37/0064 |
| | | | | 244/123.7 |
| 2008/0144249 | A1 | 6/2008 | Rawlings | |
| 2010/0193636 | A1* | 8/2010 | De Vita | B29C 66/112 |
| | | | | 244/123.1 |
| 2011/0315820 | A1 | 12/2011 | Andre | |
| 2012/0326433 | A1* | 12/2012 | Rorabaugh | B64D 37/32 |
| | | | | 285/47 |
| 2013/0149164 | A1* | 6/2013 | Hansen | B29C 65/7855 |
| | | | | 416/226 |
| 2014/0284431 | A1* | 9/2014 | Grankaell | B29D 99/0028 |
| | | | | 244/90 R |
| 2015/0274316 | A1 | 10/2015 | Kamihara et al. | |
| 2017/0015402 | A1* | 1/2017 | Lakic | B64C 1/26 |
| 2017/0271711 | A1* | 9/2017 | Benthien | H01M 4/661 |
| 2017/0369149 | A1 | 12/2017 | Walker et al. | |
| 2018/0072399 | A1* | 3/2018 | Walker | B64C 3/182 |
| 2020/0223560 | A1 | 7/2020 | Walker | |
| 2021/0001973 | A1* | 1/2021 | Witt | B64C 3/185 |
| 2021/0039768 | A1* | 2/2021 | Rolfes | B64C 5/02 |

OTHER PUBLICATIONS

United States Patent and Trademark Office, "Non-Final Office Action," issued in connection with U.S. Appl. No. 16/247,222, dated Sep. 30, 2020, 6 pages.

United States Patent and Trademark Office, "Notice of Allowance and Fee(s) Due," issued in connection with U.S. Appl. No. 16/247,222, dated Dec. 11, 2020, 5 pages.

* cited by examiner

AIRCRAFT WING COMPOSITE RIBS HAVING ELECTRICAL GROUNDING PATHS

FIELD OF THE DISCLOSURE

This disclosure relates generally to composite ribs for aircraft wings and, more specifically, to aircraft wing composite ribs having electrical grounding paths.

BACKGROUND

Ribs are commonly implemented within aircraft wings (e.g., between upper and lower skin panels of the aircraft wing, and between front and rear spars of the aircraft wing) as structural, load-bearing devices configured to provide tensile and/or compressive support to enhance the overall structural integrity of the aircraft wings. Known ribs include a metallic panel that is configured to be vertically oriented between the upper and lower skin panels of the aircraft wing, a first metallic rib post configured to couple the metallic panel to the front spar of the aircraft wing, a second metallic rib post configured to couple the metallic panel to the rear spar of the aircraft wing, first (e.g., upper) metallic fittings configured to couple the metallic panel to the upper skin panel of the aircraft wing, and second (e.g., lower) metallic fittings configured to couple the metallic panel to the lower skin panel of the aircraft wing. Current return network (CRN) cables can be coupled to the front and rear spars to facilitate carrying and/or dissipating electrical current and/or electrostatic charge away from the ribs and into the atmosphere.

The metallic (e.g., aluminum) components of the above-described known ribs typically have a buy-to-fly ratio and/or weight that is/are elevated relative to the buy-to-fly ratio and/or weight of non-metallic structural materials such as carbon fiber reinforced plastic (CFRP) that could alternatively be used to construct such components of the rib. Modifying the construction of known ribs to include a CFRP panel in lieu of a metallic panel can advantageously provide a rib having a relatively lower buy-to-fly ratio and/or weight.

SUMMARY

Example aircraft wing composite ribs having electrical grounding paths are disclosed herein. In some examples, a composite rib is disclosed. In some disclosed examples, the composite rib comprises a CFRP panel. In some disclosed examples, the composite rib further comprises a metallic rib post coupled to the CFRP panel and configured to be coupled to a spar of an aircraft wing. In some disclosed examples, the spar is coupled to a CRN cable. In some disclosed examples, the composite rib further comprises a metallic fitting coupled to the CFRP panel and configured to be coupled to a skin panel of the aircraft wing. In some disclosed examples, the composite rib further comprises a metallic grounding member positioned between the CFRP panel and the metallic fitting. In some disclosed examples, the metallic grounding member provides an electrical grounding path extending from the metallic fitting to the metallic rib post.

In some examples, a method for assembling a composite rib is disclosed. In some disclosed examples, the method comprises coupling a metallic grounding member to a CFRP panel. In some disclosed examples, the method further comprises coupling a metallic rib post to the CFRP panel. In some disclosed examples, the metallic rib post is configured to be coupled to a spar of an aircraft wing. In some disclosed examples, the spar is coupled to a CRN cable. In some disclosed examples, the method further comprises coupling a metallic fitting to the CFRP panel. In some disclosed examples, the metallic fitting is configured to be coupled to a skin panel of the aircraft wing. In some disclosed examples of the method, the metallic grounding member is positioned between the CFRP panel and the metallic fitting, and the metallic grounding member provides an electrical grounding path extending from the metallic fitting to the metallic rib post.

Example metallic fittings or coupling composite ribs to skin panels of aircraft wings are also disclosed herein. In some examples, a metallic fitting configured to couple a composite rib to a skin panel of an aircraft wing is disclosed. In some disclosed examples, the metallic fitting comprises a through hole configured to receive a fastener. In some disclosed examples, the fastener is configured to couple the metallic fitting to the composite rib. In some disclosed examples, the metallic fitting further comprises a bore configured to receive a bolt. In some disclosed examples, the metallic fitting further comprises a cavity intersecting the bore. In some disclosed examples, the cavity has an access opening. In some disclosed examples, the metallic fitting further comprises a barrel nut located within the cavity. In some disclosed examples, the barrel nut is configured to threadably engage the bolt to couple the metallic fitting to the skin panel. In some disclosed examples, the metallic fitting further comprises a seal located within the cavity. In some disclosed examples, the seal is configured to close the access opening.

In some examples, a method for coupling a composite rib to a skin panel of an aircraft wing via a metallic fitting is disclosed. In some disclosed examples, the method comprises extending a fastener through a through hole of the metallic fitting to couple the metallic fitting to the composite rib. In some disclosed examples, the method further comprises extending a bolt into a bore of the metallic fitting to couple the metallic fitting to the skin panel. In some disclosed examples, the bolt threadably engages a barrel nut located within a cavity of the metallic fitting. In some disclosed examples, the cavity intersects the bore and has an access opening. In some disclosed examples, the access opening is closed by a seal located within the cavity.

Figure 1:
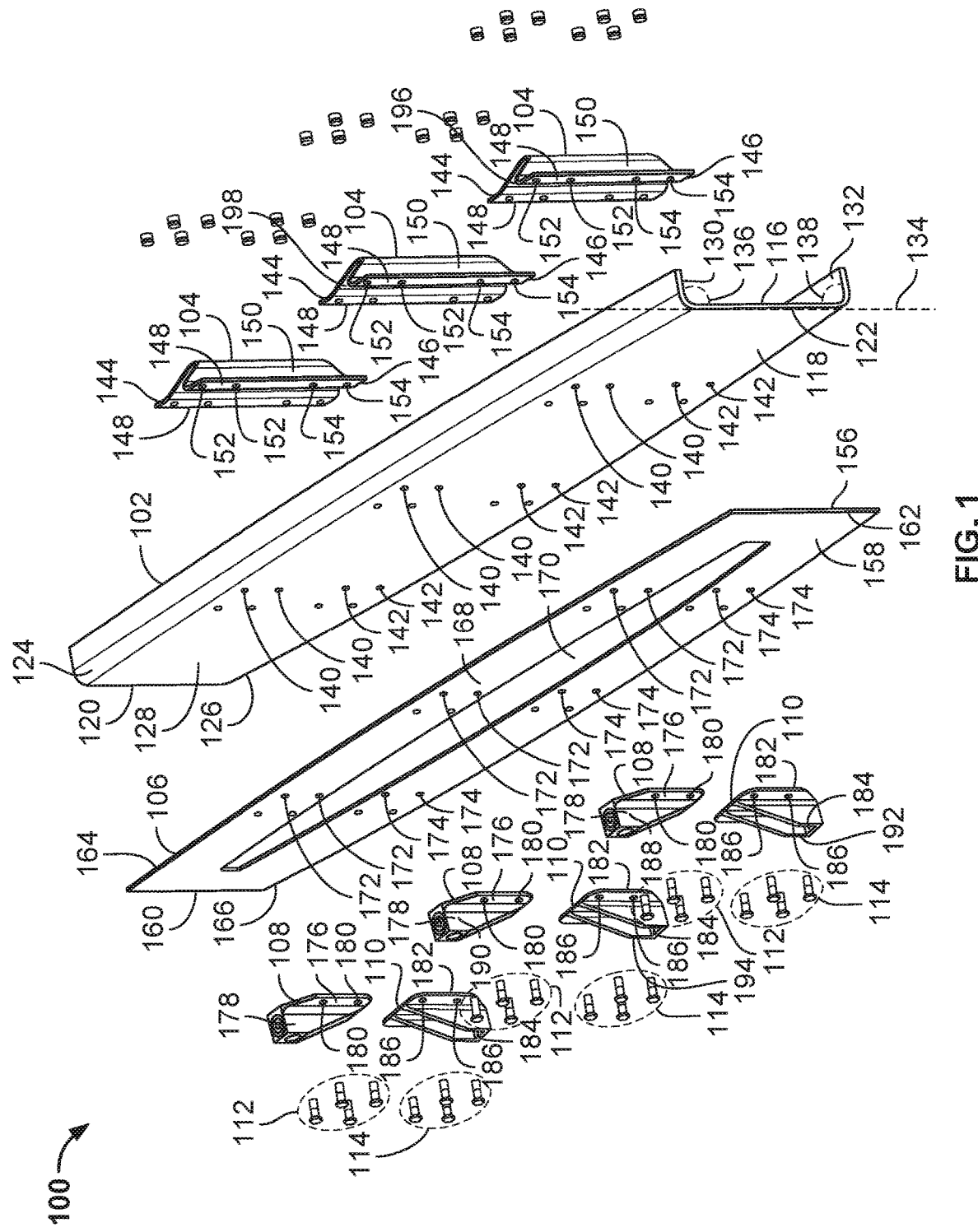
FIG. 1 is an exploded view of an example composite rib constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

As used herein in the context of describing a member, part or component of an apparatus, the term "structural" means that the member, part or component is a load-bearing member, part or component that is essential to the stability of the apparatus. For example, a structural component of a composite rib of an aircraft wing is a load-bearing component that is essential to the stability of the composite rib and/or the aircraft wing. Conversely, as used herein in the context of describing a member, part or component of an apparatus, the term "non-structural" means that the member, part or component is a non-load-bearing member, part or component that is not essential to the stability of the apparatus. For example, a non-structural component of a composite rib of an aircraft wing is a non-load-bearing component that is not essential to the stability of the composite rib and/or the aircraft wing.

Known ribs include a metallic panel that is configured to be vertically oriented between the upper and lower skin panels of the aircraft wing, a first metallic rib post configured to couple the metallic panel to a front spar of the aircraft wing, a second metallic rib post configured to couple the metallic panel to a rear spar of the aircraft wing, first (e.g., upper) metallic fittings configured to couple the metallic panel to the upper skin panel of the aircraft wing, and second (e.g., lower) metallic fittings configured to couple the metallic panel to the lower skin panel of the aircraft wing. The metallic (e.g., aluminum) components of such ribs typically have a buy-to-fly ratio and/or weight that is/are elevated relative to the buy-to-fly ratio and/or weight of non-metallic structural materials such as CFRP that could alternatively be used to construct such components of the rib. Modifying the construction of known ribs to include a CFRP panel in lieu of a metallic panel can advantageously provide a rib having a relatively lower buy-to-fly ratio and/or weight.

Implementing a rib having a CFRP panel instead of a metallic panel can also advantageously reduce thermally-induced fatigue loading of the rib. For example, the coefficient of thermal expansion for CFRP is significantly lower than the coefficient of thermal expansion for aluminum. When the rib includes an aluminum panel, first (e.g., upper) aluminum fittings, and second (e.g., lower) aluminum fittings, thermal shrinkage of the aluminum panel causes tension relative to the first and/or second aluminum fittings. Replacing the aluminum panel of the rib with a CFRP panel produces a difference and/or mismatch in the coefficient of thermal expansion between the CFRP panel and the first and second aluminum fittings, thereby advantageously reducing the aforementioned tension that would otherwise exist relative to the first and/or second aluminum fittings.

While implementing a composite rib having a CFRP panel can provide the advantages described above, implementing the CFRP panel in lieu of a corresponding metallic panel can result in drawbacks with regard to lightning strike protection and/or dissipating electrostatic charge. For example, because CFRP is not a highly conductive material, implementing a composite rib having a CFRP panel in lieu of a corresponding metallic (e.g., aluminum) panel can break (e.g., eliminate) one or more electrical grounding path(s) that, in the presence of the metallic panel, would otherwise extend from the first (e.g., upper) metallic fittings (e.g., coupled to the upper skin panel of the aircraft) to the first metallic rib post (e.g., coupled to the front spar of the aircraft) and/or the second metallic rib post (e.g., coupled to the rear spar of the aircraft), and/or from the second (e.g., lower) metallic fittings (e.g., coupled to the lower skin panel of the aircraft) to the first metallic rib post (e.g., coupled to the front spar of the aircraft) and/or the second metallic rib post (e.g., coupled to the rear spar of the aircraft). Breaking the aforementioned electrical grounding path(s) prevents electrical current and/or electrostatic charge from passing to the CRN cable(s) coupled to the front and rear spars, and accordingly inhibits carrying and/or dissipating such electrical current and/or electrostatic charge away from the composite rib.

Example aircraft wing composite ribs disclosed herein advantageously include a CFRP panel, a metallic rib post, a metallic fitting, and a metallic grounding member (e.g., a metallic grounding plate or a metallic grounding cable). The metallic rib post is coupled to the CFRP panel and is configured to be coupled to a spar of an aircraft wing, the spar being coupled to a CRN cable. The metallic fitting is coupled to the CFRP panel and is configured to be coupled to a skin panel of the aircraft wing. The metallic grounding member is positioned between the CFRP panel and the metallic fitting, thereby advantageously providing an electrical grounding path that extends from the metallic fitting to the metallic rib post. The electrical grounding path enables electrical current and/or electrostatic charge to pass from the metallic fitting to the metallic rib post. The electrical current and/or electrostatic charge can thereafter pass from the metallic rib post through the spar to the CRN cable, thereby allowing for such electrical current and/or electrostatic charge to be carried and/or dissipated away from the composite rib and into the atmosphere. The electrical grounding path formed by the metallic grounding member of the example aircraft wing composite ribs disclosed herein provides enhanced and/or improved lightning strike protection without compromising and/or impeding the above-described benefits associated with implementing a composite rib having a CFRP panel in lieu of a corresponding metallic (e.g., aluminum) panel.

Figure 2:
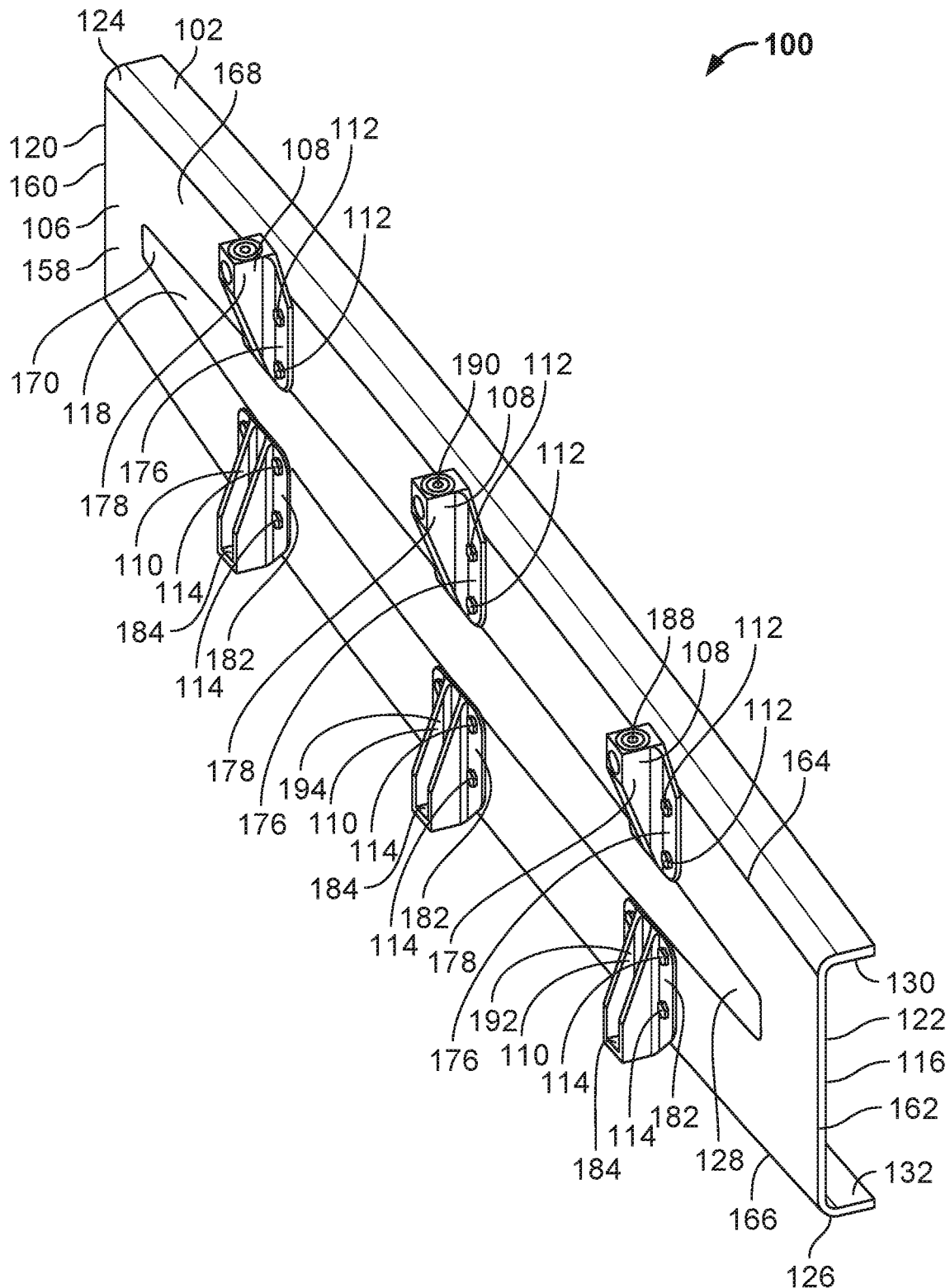
FIG. 2 is a perspective view of the example composite rib of FIG. 1 in an assembled state.
Figure 3:
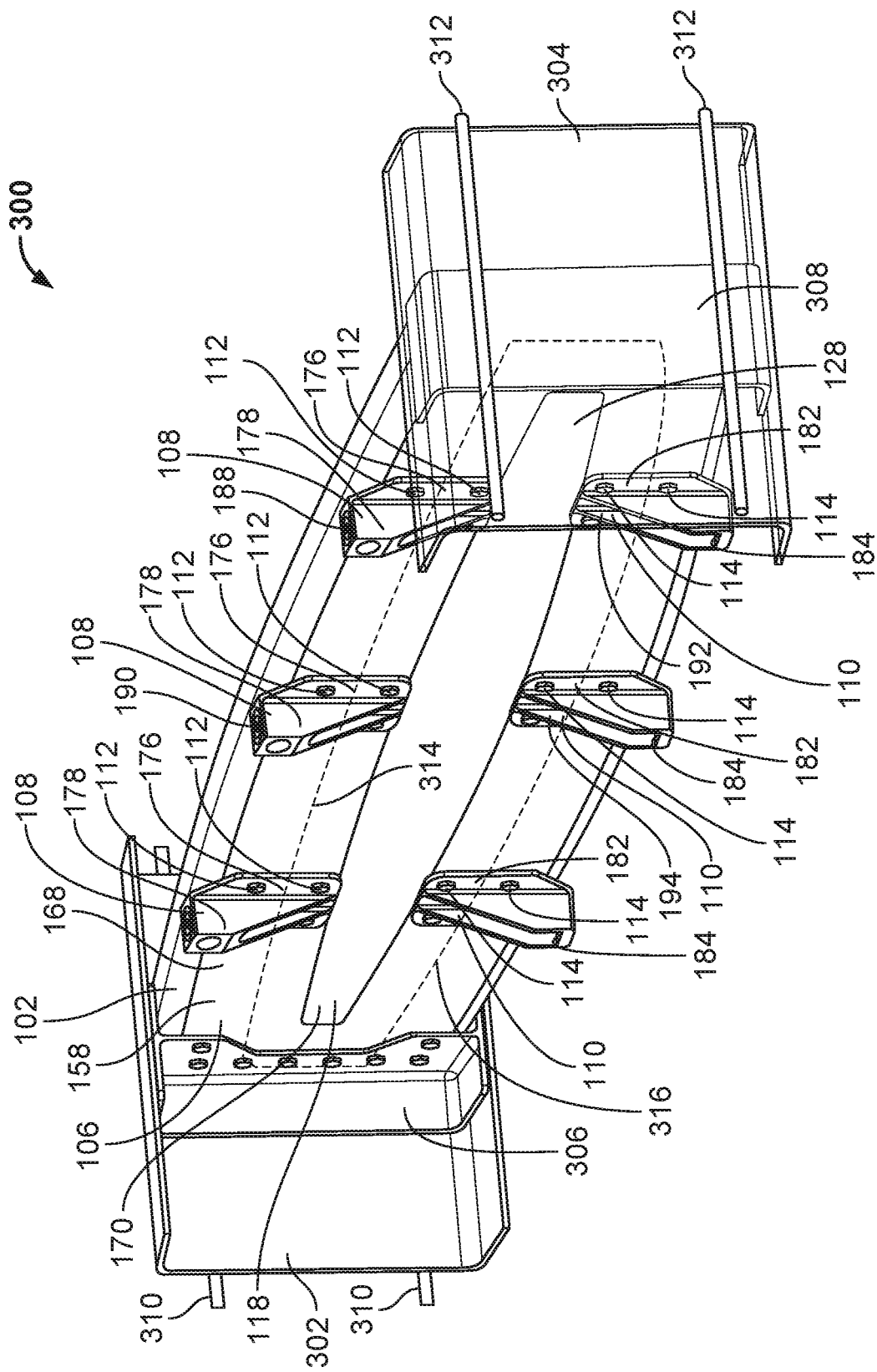
FIG. 3 is a perspective view of the example composite rib of FIGS. 1 and 2 in an assembled state and coupled to example spars of an example aircraft wing.
Figure 4:
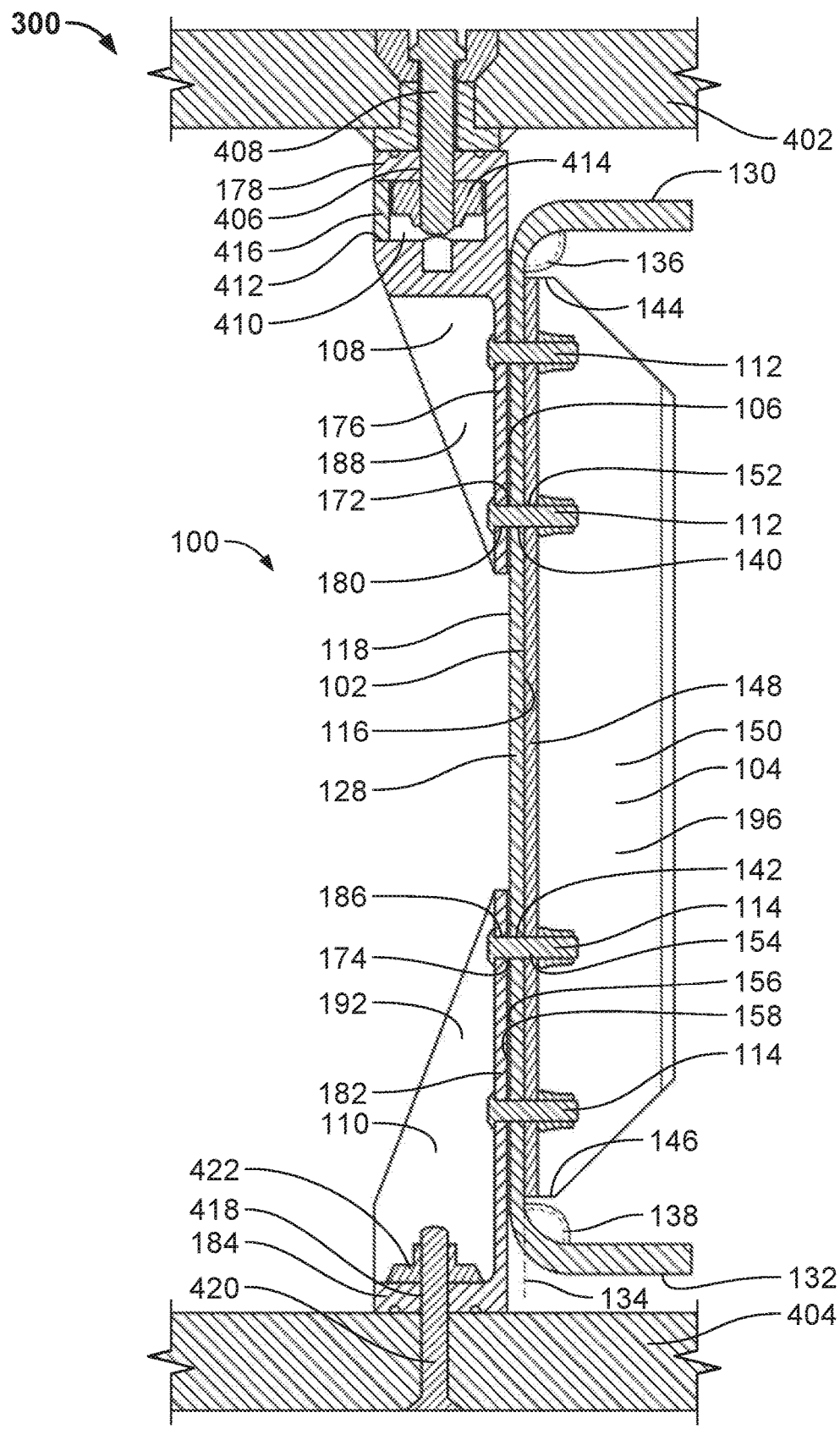
FIG. 4 is a cross-sectional view of the example composite rib of FIGS. 1-3 in an assembled state and coupled to example skin panels of the aircraft wing of FIG. 3.

FIG. 1 is an exploded view of an example composite rib 100 constructed in accordance with teachings of this disclosure. FIG. 2 is a perspective view of the example composite rib 100 of FIG. 1 in an assembled state. FIG. 3 is a perspective view of the example composite rib of FIGS. 1 and 2 in an assembled state and coupled to example spars of an example aircraft wing 300. FIG. 4 is a cross-sectional view of the example composite rib 100 of FIGS. 1-3 in an assembled state and coupled to example skin panels of the aircraft wing 300 of FIG. 3. As shown in FIGS. 3 and 4, the aircraft wing 300 includes an example front spar 302, an example rear spar 304, an example first (e.g., upper) skin panel 402, and an example second (e.g., lower) skin panel 404. The composite rib 100 of FIGS. 1-4 is configured to be coupled to the front and rear spars 302, 304 and to the upper and lower skin panels 402, 404 of the aircraft wing 300.

In the illustrated example of FIGS. 1-4, the composite rib 100 includes an example CFRP panel 102, example hat stiffeners 104, an example metallic grounding member and/or metallic grounding plate 106, an example first (e.g., upper) metallic fittings 108, example second (e.g., lower) metallic fittings 110, example first (e.g., upper) fasteners 112, and example second (e.g., lower) fasteners 114. As shown in FIG. 3, the composite rib 100 of FIGS. 1-4 further includes an example first metallic rib post 306 configured to couple the composite rib 100 to the front spar 302 of the aircraft wing 300, and an example second metallic rib post 308 configured to couple the composite rib 100 to the rear spar 304 of the aircraft wing 300.

As shown in FIG. 1, the composite rib 100 of FIGS. 1-4 includes three (3) hat stiffeners 104, three (3) first metallic fittings 108, three (3) second metallic fittings 110, twelve (12) first fasteners 112, and twelve (12) second fasteners 114. In other examples, the number of hat stiffeners 104, first metallic fittings 108, second metallic fittings 110, first fasteners 112, and/or second fasteners 114 can differ from that shown in FIG. 1. For example, the composite rib 100 can include any number (e.g., 1, 2, 4, 6, 12, etc.) of hat stiffeners 104, any number (e.g., 1, 2, 4, 6, 12, etc.) of first metallic fittings 108, any number (e.g., 1, 2, 4, 6, 12, etc.) of second metallic fittings 110, any number (e.g., 1, 2, 3, 6, 9, 24, etc.) of first fasteners 112, and/or any number (e.g., 1, 2, 3, 6, 9, 24, etc.) of second fasteners 114.

In the illustrated example of FIGS. 1-4, the number of hat stiffeners 104, the number of first metallic fittings 108, and the number of second metallic fittings 110 are all equal to one another. In other examples, the number of hat stiffeners 104, the number of first metallic fittings 108, and/or the number of second metallic fittings 110 can differ from one another. In the illustrated example of FIGS. 1-4, the number of first fasteners 112 is equal to the number of second fasteners 114, each of the first metallic fittings 108 is configured to receive the same number (e.g., four) of the first fasteners 112, and each of the second metallic fittings is configured to receive the same number (e.g., four) of the second fasteners 114. In other examples, the number of first fasteners 112 can differ from the number of second fasteners 114, respective ones of the first metallic fittings 108 can be configured to receive a different number of the first fasteners 112 relative to one another, and/or respective ones of the second metallic fittings can be configured to receive a different number of the second fasteners 114 relative to one another.

The CFRP panel 102 of FIGS. 1-4 is a structural and/or load-bearing member of the composite rib 100. In the illustrated example of FIGS. 1-4, the CFRP panel 102 includes an example first surface 116, an example second surface 118 located opposite the first surface 116 of the CFRP panel 102, an example first end 120, an example second end 122 located opposite the first end 120 of the CFRP panel 102, a third (e.g., upper) surface 124 extending between the first and second ends 120, 122 of the CFRP panel 102, and a fourth (e.g., lower) surface 126 extending between the first and second ends 120, 122 of the CFRP panel 102 and located opposite the third surface 124 of the CFRP panel 102. In some examples, the first surface 116 of the CFRP panel 102 is an inboard-facing surface (e.g., facing and/or oriented toward a fuselage of the aircraft), and the second surface 118 of the CFRP panel 102 is an outboard-facing surface (e.g., facing and/or oriented away from the fuselage of the aircraft). In other examples, the first surface 116 of the CFRP panel 102 can be an outboard-facing surface, and the second surface 118 of the CFRP panel 102 can be an inboard-facing surface. In some examples, the first end 120 of the CFRP panel 102 is a forward-facing end (e.g., facing and/or oriented toward a front spar and/or a leading edge of the wing of the aircraft), and the second end 122 of the CFRP panel 102 is a rearward-facing end (e.g., facing and/or oriented toward a rear spar and/or a trailing edge of the wing of the aircraft). In other examples, the first end 120 of the CFRP panel 102 can be a rearward-facing end, and the second end 122 of the CFRP panel 102 can be a forward-facing end.

In the illustrated example of FIGS. 1-4, the third surface 124 of the CFRP panel 102 is an upper and/or upward-facing surface configured to be oriented toward an example upper skin panel 402 of the aircraft wing 300, and the fourth surface 126 of the CFRP panel 102 is a lower and/or downward-facing surface configured to be oriented toward an example lower skin panel 404 of the aircraft wing 300. As shown in FIGS. 1-4, the third surface 124 of the CFRP panel 102 has a concave downward curvature between the first and second ends 120, 122 of the CFRP panel 102, and the fourth surface 126 of the CFRP panel 102 has a concave upward curvature between the first and second ends 120, 122 of the CFRP panel 102. In some examples, the concave downward curvature of the third surface 124 of the CFRP panel 102 can track, match and/or be complementary to a corresponding concave downward curvature of the upper skin panel 402 of the aircraft wing 300, and the concave upward curvature of the fourth surface 126 of the CFRP panel 102 can track, match and/or be complementary to a corresponding concave upward curvature of the lower skin panel 404 of the aircraft wing 300. In other examples, the third surface 124 and/or the fourth surface 126 of the CFRP panel 102 can have a curvature which differs from that shown in FIGS. 1-4. In some examples, the third surface 124 and/or the fourth surface 126 of the CFRP panel 102 can be a linear surface.

The CFRP panel 102 of FIGS. 1-4 further includes an example central segment 128, an example first flange 130, and an example second flange 132. In the illustrated example of FIGS. 1-4, the boundaries of the central segment 128 of the CFRP panel 102 are formed and/or defined by the first and second ends 120, 122 and the third and fourth surfaces 124, 126 of the CFRP panel 102. The central segment 128 of the CFRP panel 102 defines an example plane 134 that extends and/or is oriented vertically between the upper and lower skin panels 402, 404 of the aircraft wing 300 when the composite rib 100 is coupled to the aircraft wing 300. As shown in FIGS. 1-4, the first flange 130 of the CFRP panel 102 is formed along and/or proximate to the third surface 124 of the CFRP panel 102, and the second flange 132 of the CFRP panel 102 is formed along and/or proximate to the fourth surface 126 of the CFRP panel 102.

In the illustrated example of FIGS. 1-4, the first and second flanges 130, 132 of the CFRP panel 102 are respectively formed as continuous members extending between the first and second ends 120, 122 of the CFRP panel 102. In other examples, the first flange 130 and/or the second flange 132 of the CFRP panel 102 can alternatively be implemented as multiple flanges that are separated and/or spaced-apart from one another. For example, the first flange 130 of the CFRP panel 102 can be implemented as multiple flanges that are spaced apart from one another and formed along and/or proximate to the third surface 124 of the CFRP panel 102. As another example, the second flange 132 of the CFRP panel 102 can be implemented as multiple flanges that are spaced apart from one another and formed along and/or proximate to the fourth surface 126 of the CFRP panel 102. In still other examples, the first flanges 130 and/or the second flanges 132 can be omitted from the CFRP panel 102.

The first flange 130 of the CFRP panel 102 of FIGS. 1-4 extends away from the central segment 128 of the CFRP panel 102 at an example first angle 136 relative to the plane 134 of the central segment 128, and the second flange 132 of the CFRP panel 102 of FIGS. 1-4 extends away from the central segment 128 of the CFRP panel 102 at an example second angle 138 relative to the plane 134 of the central segment 128. In the illustrated example of FIGS. 1-4, the first and second angles 136, 138 are each approximately equal to ninety degrees. In other examples, the first angle 136 and/or the second angle 138 can be a value greater than or less than ninety degrees (e.g., eighty degrees, one hundred degrees, etc.).

The CFRP panel 102 of FIGS. 1-4 further includes example first (e.g., upper) through holes 140 extending from the first surface 116 of the CFRP panel 102 through to the second surface 118 of the CFRP panel 102, as well as example second (e.g., lower) through holes 142 also extending from the first surface 116 of the CFRP panel 102 through to the second surface 118 of the CFRP panel 102. As further described below, the first (e.g., upper) through holes 140 of the CFRP panel 102 are configured to receive corresponding ones of the first (e.g., upper) fasteners 112 to facilitate coupling the hat stiffeners 104, the metallic grounding plate 106, and/or the first (e.g., upper) metallic fittings 108 to the CFRP panel 102 of the composite rib 100. Similarly, the second (e.g., lower) through holes 142 of the CFRP panel 102 are configured to receive corresponding ones of the second (e.g., lower) fasteners 114 to facilitate coupling the hat stiffeners 104, the metallic grounding plate 106, and/or the second (e.g., lower) metallic fittings 110 to the CFRP panel 102 of the composite rib 100.

The CFRP panel 102 can include any number of first (e.g., upper) through holes 140 configured, positioned and/or oriented to receive any corresponding number of first (e.g., upper) fasteners 112, and/or to align with any corresponding number of through holes formed respectively in the hat stiffeners 104, the metallic grounding plate 106, and/or the first metallic fittings 108 of the composite rib 100. Similarly, the CFRP panel 102 can include any number of second (e.g., lower) through holes 142 configured, positioned and/or oriented to receive any corresponding number of second (e.g., lower) fasteners 114, and/or to align with any corresponding number of through holes formed respectively in the hat stiffeners 104, the metallic grounding plate 106, and/or the second metallic fittings 110 of the composite rib 100.

The hat stiffeners 104 of FIGS. 1-4 are structural and/or load-bearing members of the composite rib 100. In some examples, the hat stiffeners 104 can be CFRP hat stiffeners, and can accordingly be made from the same material as the CFRP panel 102 of the composite rib 100. In other examples, one or more of the hat stiffeners 104 can alternatively be made from a material other than CFRP including, for example, a different plastic material and/or a metal material. In the illustrated example of FIGS. 1-4, each one of the hat stiffeners 104 includes an example first (e.g., upper) end 144, and an example second (e.g., lower) end 146 located opposite the first end 144 of the hat stiffener 104, a pair of example flanges 148 extending between the first and second ends 144, 146 of the hat stiffener 104, and an example hat portion 150 extending between the first and second ends 144, 146 of the hat stiffener 104 and bridging and extending away from the flanges 148 of the hat stiffener 104. In the illustrated example of FIGS. 1-4, the first end 144 of each hat stiffener 104 is an upper and/or upward-facing end configured to be oriented toward the upper skin panel 402 of the aircraft wing 300, and the second end 146 of each hat stiffener 104 is a lower and/or downward-facing end configured to be oriented toward the lower skin panel 404 of the aircraft wing 300.

The flanges 148 of each hat stiffener 104 of FIGS. 1-4 include example first (e.g., upper) through holes 152 extending through the flanges 148 of the hat stiffener 104, as well as example second (e.g., lower) through holes 154 extending through the flanges 148 of the hat stiffener 104. As further described below, the first (e.g., upper) through holes 152 of each hat stiffener 104 are configured to receive corresponding ones of the first (e.g., upper) fasteners 112 to facilitate coupling the hat stiffener 104 to the CFRP panel 102 of the composite rib 100. Similarly, the second (e.g., lower) through holes 154 of each hat stiffener 104 are configured to receive corresponding ones of the second (e.g., lower) fasteners 114 to facilitate coupling the hat stiffener 104 to the CFRP panel 102 of the composite rib 100.

The hat stiffeners 104 can include any number of first (e.g., upper) through holes 152 configured, positioned and/or oriented to receive any corresponding number of first (e.g., upper) fasteners 112, and/or to align with any corresponding number of through holes formed respectively in the CFRP panel 102, the metallic grounding plate 106, and/or the first metallic fittings 108 of the composite rib 100. Similarly, the hat stiffeners 104 can include any number of second (e.g., lower) through holes 154 configured, positioned and/or oriented to receive any corresponding number of second (e.g., lower) fasteners 114, and/or to align with any corresponding number of through holes formed respectively in the CFRP panel 102, the metallic grounding plate 106, and/or the second metallic fittings 110 of the composite rib 100.

When the composite rib 100 of FIGS. 1-4 is in an assembled state (e.g., as shown in FIGS. 2-4), the hat stiffeners 104 are coupled to the CFRP panel 102. In some examples, the hat stiffeners 104 are coupled to the CFRP panel 102 by bonding the flanges 148 of the hat stiffeners 104 to the first surface 116 of the CFRP panel 102. In some examples, the hat stiffeners 104 are additionally or alternatively coupled to the CFRP panel 102 by extending one or more of the first (e.g., upper) fastener(s) 112 through a corresponding one or more of the first (e.g., upper) through hole(s) 140 of the CFRP panel 102 and through a corresponding one or more of the first (e.g., upper) through hole(s) 152 of the hat stiffeners 104, and/or by extending one or more of the second (e.g., lower) fastener(s) 114 through a corresponding one or more of the second (e.g., lower) through hole(s) 142 of the CFRP panel 102 and through a corresponding one or more of the second (e.g., lower) through hole(s) 154 of the hat stiffeners 104.

In the illustrated example of FIGS. 2-4, the flanges 148 of each one of the hat stiffeners 104 contact the first surface 116 of the CFRP panel 102. Each one of the hat stiffeners 104 is positioned along the first surface 116 of the CFRP panel 102 such that the first end 144 of the hat stiffener 104 faces and/or is oriented toward the third surface 124 and/or the first flange 130 of the CFRP panel 102, and the second end 146 of the hat stiffener 104 faces and/or is oriented toward the fourth surface 126 and/or the second flange 132 of the CFRP panel 102. Each one of the hat stiffeners 104 is accordingly located between the third and fourth surfaces 124, 126 of the CFRP panel 102, and/or between the first and second flanges 130, 132 of the CFRP panel 102.

The metallic grounding plate 106 of FIGS. 1-4 is a non-structural and/or non-load-bearing member of the composite rib 100. In some examples, the metallic grounding plate 106 can be made from aluminum, which is a highly conductive metal. In other examples, the metallic grounding plate 106 can alternatively be made from a metal material other than aluminum including, for example, another highly conductive metal such as copper or nickel. In the illustrated example of FIGS. 1-4, the metallic grounding plate 106 includes an example first surface 156, an example second surface 158 located opposite the first surface 156 of the metallic grounding plate 106, an example first end 160, an example second end 162 located opposite the first end 160 of the metallic grounding plate 106, a third (e.g., upper) surface 164 extending between the first and second ends 160, 162 of the metallic grounding plate 106, and a fourth (e.g., lower) surface 166 extending between the first and second ends 160, 162 of the metallic grounding plate 106 and located opposite the third surface 164 of the metallic grounding plate 106. The first surface 156 of the metallic grounding plate 106 faces and/or is oriented toward the second surface 118 of the CFRP panel 102. The second surface 158 of the metallic grounding plate 106 faces and/or is oriented away from the second surface of the CFRP panel 102 and toward the first and second metallic fittings 108, 110. The first end 160 of the metallic grounding plate 106 faces and/or is oriented toward the first end 120 of the CFRP panel 102, and the second end 162 of the metallic grounding plate 106 faces and/or is oriented toward the second end 122 of the CFRP panel 102.

The third surface 164 of the metallic grounding plate 106 faces and/or is oriented toward the third surface 124 of the CFRP panel 102, and the fourth surface 166 of the metallic grounding plate 106 faces and/or is oriented toward the fourth surface 126 of the CFRP panel 102. As shown in FIGS. 1-4, the third surface 164 of the metallic grounding plate 106 has a concave downward curvature between the first and second ends 160, 162 of the metallic grounding plate 106, and the fourth surface 166 of the metallic grounding plate 106 has a concave upward curvature between the first and second ends 160, 162 of the metallic grounding plate 106. In the illustrated example of FIGS. 1-4, the concave downward curvature of the third surface 164 of the metallic grounding plate 106 tracks, matches and/or is complementary to the concave downward curvature of the third surface 124 of the CFRP panel 102, and the concave upward curvature of the fourth surface 166 of the metallic grounding plate 106 tracks, matches and/or is complementary to the concave upward curvature of the fourth surface 126 of the CFRP panel 102. In other examples, the third surface 164 and/or the fourth surface 166 of the metallic grounding plate 106 can have a curvature which differs from that shown in FIGS. 1-4. In some examples, the third surface 164 and/or the fourth surface 166 of the metallic grounding plate 106 can be a linear surface.

The metallic grounding plate 106 of FIGS. 1-4 further includes an example border 168 and an example opening 170. In the illustrated example of FIGS. 1-4, the border 168 of the metallic grounding plate 106 surrounds the opening 170 of the metallic grounding plate 106. The outer boundaries of the border 168 of the metallic grounding plate 106 are formed and/or defined by the first and second ends 160, 162 and the third and fourth surfaces 164, 166 of the metallic grounding plate 106. The inner boundaries of the border 168 of the metallic grounding plate 106 are formed and/or defined by the opening 170. The opening 170 of the metallic grounding plate 106 extends from the first surface 156 of the metallic grounding plate 106 through to the second surface 158 of the metallic grounding plate 106. The presence of the opening 170 reduces the overall weight of the metallic grounding plate 106 relative to an alternative implementation of the metallic grounding plate 106 that lacks the opening 170. In the illustrated example of FIGS. 1-4, the opening 170 of the metallic grounding plate 106 is located between the first metallic fittings 108 and the second metallic fittings 110 of the composite rib 100.

As further described below in connection with FIG. 3, the border 168 and/or, more generally, the metallic grounding plate 106 provides a first electrical grounding path extending from the first metallic fittings 108 of the composite rib 100 to one or more example metallic rib posts of the composite rib 100, and further provides a second electrical grounding path extending from the second metallic fittings 110 of the composite rib 100 to the one or more metallic rib posts of the composite rib 100. As further described below in connection with FIG. 3, the border 168 and/or, more generally, the metallic grounding plate 106 connects the first electrical grounding path to the second electrical grounding path.

In the illustrated example of FIGS. 1-4, the border 168 of the metallic grounding plate 106 has an elongated annular shape extending between the first and second ends 160, 162 and the third and fourth surfaces 164, 166 of the metallic grounding plate 106. In other examples, the border 168 and/or, more generally, the metallic grounding plate 106 can be implemented in a different manner that nonetheless provides one or more electrical grounding path(s) extending from the first and/or second metallic fittings 108, 110 of the composite rib 100 to one or more metallic rib posts of the composite rib 100. For example, the border 168 and/or, more generally, the metallic grounding plate 106 can be constructed in a manner that omits the opening 170 from the metallic grounding plate 106. As another example, the border 168 and/or, more generally, the metallic grounding plate 106 can be constructed in a manner that provides multiple (e.g., 2, 3, 10, 50, etc.) openings in lieu of the single opening 170 shown in FIGS. 1-4. As another example, the border 168 and/or, more generally, the metallic grounding plate 106 can be constructed to have a non-annular shape. The border 168 and/or, more generally, the metallic grounding plate 106 can be constructed to have any shape (e.g., any regular or irregular shape) and/or any pattern (e.g., any regular or irregular pattern) that provides one or more electrical grounding path(s) extending from the first and/or second metallic fittings 108, 110 of the composite rib 100 to one or more metallic rib posts of the composite rib 100.

The metallic grounding plate 106 of FIGS. 1-4 further includes example first (e.g., upper) through holes 172 extending from the first surface 156 of the metallic grounding plate 106 through to the second surface 158 of the metallic grounding plate 106, as well as example second (e.g., lower) through holes 174 also extending from the first surface 156 of the metallic grounding plate 106 through to the second surface 158 of the metallic grounding plate 106. As further described below, the first (e.g., upper) through holes 172 of the metallic grounding plate 106 are configured to receive corresponding ones of the first (e.g., upper) fasteners 112 to facilitate coupling the metallic grounding plate 106 and/or the first (e.g., upper) metallic fittings 108 to the CFRP panel 102 of the composite rib 100. Similarly, the second (e.g., lower) through holes 174 of the metallic grounding plate 106 are configured to receive corresponding ones of the second (e.g., lower) fasteners 114 to facilitate coupling the metallic grounding plate 106 and/or the second (e.g., lower) metallic fittings 110 to the CFRP panel 102 of the composite rib 100.

The metallic grounding plate 106 can include any number of first (e.g., upper) through holes 172 configured, positioned and/or oriented to receive any corresponding number of first (e.g., upper) fasteners 112, and/or to align with any corresponding number of through holes formed respectively in the CFRP panel 102, the hat stiffeners 104, and/or the first metallic fittings 108 of the composite rib 100. Similarly, the metallic grounding plate 106 can include any number of second (e.g., lower) through holes 174 configured, positioned and/or oriented to receive any corresponding number of second (e.g., lower) fasteners 114, and/or to align with any corresponding number of through holes formed respectively in the CFRP panel 102, the hat stiffeners 104, and/or the second metallic fittings 110 of the composite rib 100.

When the composite rib 100 of FIGS. 1-4 is in an assembled state (e.g., as shown in FIGS. 2-4), the metallic grounding plate 106 is coupled to the CFRP panel 102. In some examples, the metallic grounding plate 106 is coupled to the CFRP panel 102 by bonding the first surface 156 of the metallic grounding plate 106 to the second surface 118 of the CFRP panel 102. In some examples, the metallic grounding plate 106 is additionally or alternatively coupled to the CFRP panel 102 by extending one or more of the first (e.g., upper) fastener(s) 112 through a corresponding one or more of the first (e.g., upper) through hole(s) 172 of the metallic grounding plate 106 and through a corresponding one or more of the first (e.g., upper) through hole(s) 140 of the CFRP panel 102, and/or by extending one or more of the second (e.g., lower) fastener(s) 114 through a corresponding one or more of the second (e.g., lower) through hole(s) 174 of the metallic grounding plate 106 and through a corresponding one or more of the second (e.g., lower) through hole(s) 142 of the CFRP panel 102.

In the illustrated example of FIGS. 2-4, the metallic grounding plate 106 is positioned and/or located between the CFRP panel 102 and the first and second metallic fittings 108, 110. The first surface 156 of the metallic grounding plate 106 contacts the second surface 118 of the CFRP panel 102. The first metallic fittings 108 and the second metallic fittings 110 are respectively positioned, located, and/or arranged about the border 168 of the metallic grounding plate 106. The second surface 158 of the metallic grounding plate 106 contacts each of the first (e.g., upper) metallic fittings 108 and each of the second (e.g., lower) metallic fittings 110, thereby facilitating formation of the electrical grounding paths shown in FIG. 3 and further described below.

Figure 5:
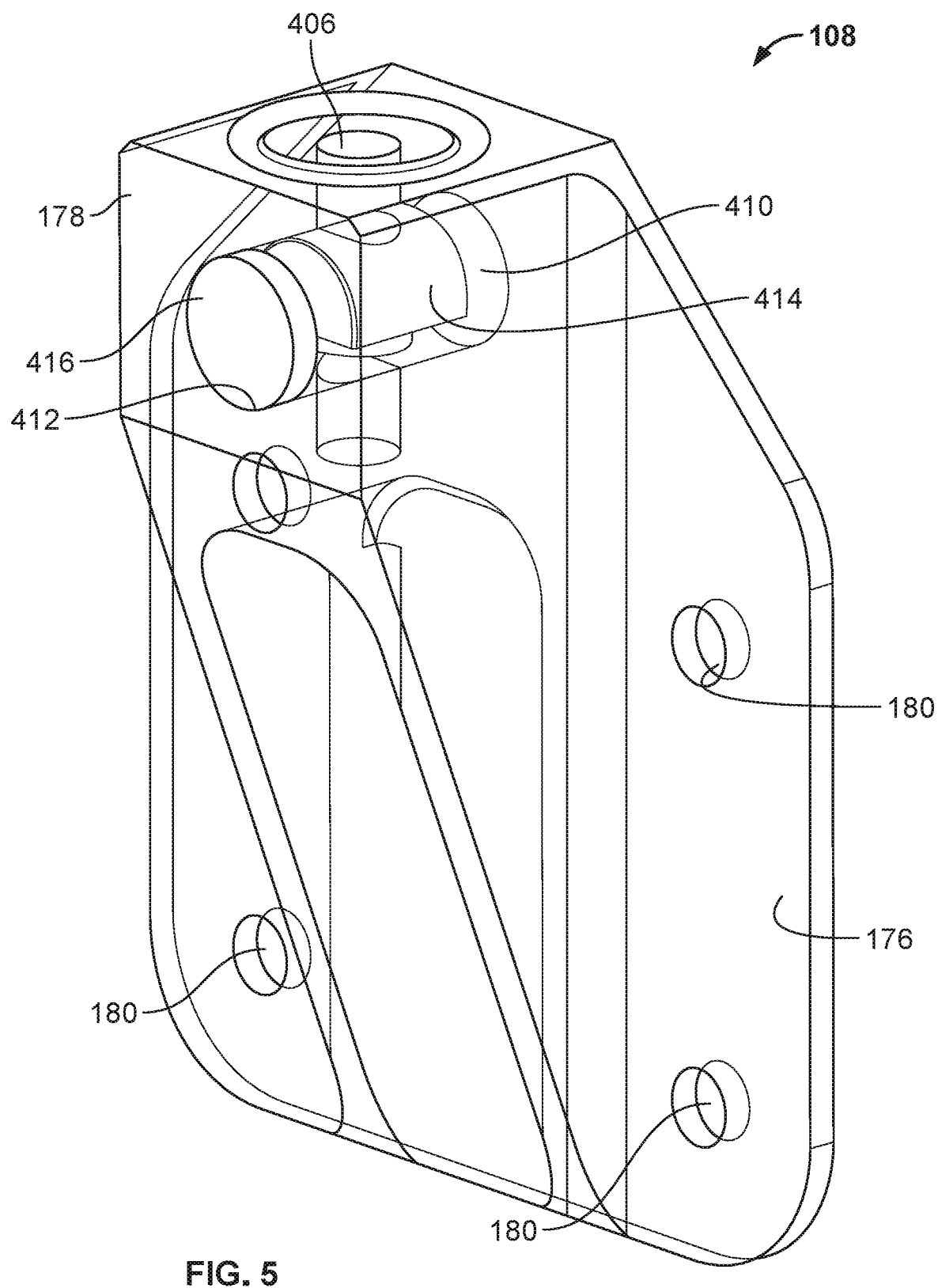
FIG. 5 is a perspective view of one of the example first metallic fittings of the example composite rib of FIGS. 1-4.

FIG. 5 is a perspective view of one of the first metallic fittings 108 of the composite rib 100 of FIGS. 1-4. In FIG. 5, certain aspects of the first metallic fitting 108 are shown transparently and/or in phantom to better enable viewing of the component parts of the first metallic fitting 108. The first (e.g., upper) metallic fittings 108 of FIGS. 1-5 are structural and/or load-bearing members of the composite rib 100. In some examples, the first metallic fittings 108 can be made from aluminum, which is a highly conductive metal. In other examples, one or more of the first metallic fittings 108 can alternatively be made from a metal material other than aluminum including, for example, another highly conductive metal such as copper or nickel. In the illustrated example of FIGS. 1-5, each one of the first metallic fittings 108 includes an example plate portion 176 and an example rib portion 178 extending away from the plate portion 176 of the first metallic fitting 108.

The plate portion 176 of each first metallic fitting 108 of FIGS. 1-5 includes example through holes 180 extending through the plate portion 176 of the first metallic fitting 108. As further described below, the through holes 180 of each first metallic fitting 108 are configured to receive corresponding ones of the first (e.g., upper) fasteners 112 to facilitate coupling the first metallic fitting 108 to the CFRP panel 102 of the composite rib 100. The first metallic fittings 108 can include any number of through holes 180 configured, positioned and/or oriented to receive any corresponding number of first (e.g., upper) fasteners 112, and/or to align with any corresponding number of through holes formed respectively in the CFRP panel 102, the hat stiffeners 104, and/or the metallic grounding plate 106 of the composite rib 100.

When the composite rib 100 of FIGS. 1-4 is in an assembled state (e.g., as shown in FIGS. 2-4), the first metallic fittings 108 are coupled to the CFRP panel 102. In some examples, the first metallic fittings 108 are coupled to the CFRP panel 102 by extending one or more of the first (e.g., upper) fastener(s) 112 through a corresponding one or more of the through hole(s) 180 of the first metallic fittings 108, through a corresponding one or more of the first (e.g., upper) through hole(s) 172 of the metallic grounding plate 106, and through a corresponding one or more of the first (e.g., upper) through hole(s) 140 of the CFRP panel 102. In the illustrated example of FIGS. 2-4, the plate portion 176 of each one of the first metallic fittings 108 contacts the second surface 158 of the metallic grounding plate 106. Each one of the first metallic fittings 108 is positioned along the border 168 of the metallic grounding plate 106 in a manner that enables formation of the electrical grounding paths shown in FIG. 3 and further described below.

The rib portion 178 of each first metallic fitting 108 of FIGS. 1-5 includes an example bore 406 (e.g., a blind hole) that is configured to receive an example first (e.g., upper) bolt 408. In the illustrated example of FIGS. 1-5, the bore 406 does not extend fully through the rib portion 178. As shown in FIGS. 4 and 5, the bore 406 of each first metallic fitting 108 is oriented orthogonally relative to the through holes 180 of the first metallic fitting 108. As shown in FIG. 4, the first bolt 408 is configured to couple the first metallic fitting 108 and/or, more generally, the composite rib 100 to the upper skin panel 402 of the aircraft wing 300. The rib portion 178 of each first metallic fitting 108 of FIGS. 1-5 further includes an example cavity 410 having an example access opening 412. The cavity 410 of the first metallic fitting 108 intersects the bore 406 of the first metallic fitting 108. In the illustrated example of FIGS. 1-5, the cavity 410 does not extend fully through the rib portion 178. As shown in FIGS. 4 and 5, the cavity 410 is configured to receive an example barrel nut 414 via the access opening 412 of the first metallic fitting 108. As shown in FIG. 4, the barrel nut 414 of the first metallic fitting 108 is positioned within the cavity 410 and configured to threadably engage the first bolt 408 to couple the first metallic fitting 108 to the upper skin panel 402 of the aircraft wing 300.

The rib portion 178 of each first metallic fitting 108 of FIGS. 1-5 further includes an example seal 416 located within the cavity 410. As shown in FIGS. 4 and 5, the seal 416 of the first metallic fitting 108 is configured to close and/or fill the access opening 412 of the cavity 410 once the barrel nut 414 has been positioned within the cavity 410 of the first metallic fitting 108. In some examples, the seal 416 is configured to prevent electrical sparks from passing out of the cavity 410 through the access opening 412. In some examples, the seal 416 interfaces with fuel contained within the aircraft wing 300.

The second (e.g., lower) metallic fittings 110 of FIGS. 1-4 are structural and/or load-bearing members of the composite rib 100. In some examples, the second metallic fittings 110 can be made from aluminum, which is a highly conductive metal. In other examples, one or more of the second metallic fittings 110 can alternatively be made from a metal material other than aluminum including, for example, another highly conductive metal such as copper or nickel. In the illustrated example of FIGS. 1-4, each one of the second metallic fittings 110 includes an example plate portion 182 and an example rib portion 184 extending away from the plate portion 182 of the second metallic fitting 110.

The plate portion 182 of each second metallic fitting 110 of FIGS. 1-4 includes example first through holes 186 extending through the plate portion 182 of the second metallic fitting 110. As further described below, the first through holes 186 of each second metallic fitting 110 are configured to receive corresponding ones of the second (e.g., lower) fasteners 114 to facilitate coupling the second metallic fitting 110 to the CFRP panel 102 of the composite rib 100. The second metallic fittings 110 can include any number of first through holes 186 configured, positioned and/or oriented to receive any corresponding number of second (e.g., lower) fasteners 114, and/or to align with any corresponding number of through holes formed respectively in the CFRP panel 102, the hat stiffeners 104, and/or the metallic grounding plate 106 of the composite rib 100.

When the composite rib 100 of FIGS. 1-4 is in an assembled state (e.g., as shown in FIGS. 2-4), the second metallic fittings 110 are coupled to the CFRP panel 102. In some examples, the second metallic fittings 110 are coupled to the CFRP panel 102 by extending one or more of the second (e.g., lower) fastener(s) 114 through a corresponding one or more of the first through hole(s) 186 of the second metallic fittings 110, through a corresponding one or more of the second (e.g., lower) through hole(s) 174 of the metallic grounding plate 106, and through a corresponding one or more of the second (e.g., lower) through hole(s) 142 of the CFRP panel 102. In the illustrated example of FIGS. 2-4, the plate portion 182 of each one of the second metallic fittings 110 contacts the second surface 158 of the metallic grounding plate 106. Each one of the second metallic fittings 110 is positioned along the border 168 of the metallic grounding plate 106 in a manner that enables formation of the electrical grounding paths described below.

The rib portion 184 of each second metallic fitting 110 of FIGS. 1-4 includes an example second through hole 418 that is configured to receive an example second (e.g., lower) bolt 420. In the illustrated example of FIGS. 1-4, the second through hole 418 of each second metallic fitting 110 is oriented orthogonally relative to the first through holes 186 of the second metallic fitting 110. As shown in FIG. 4, the second bolt 420 is configured to couple the second metallic fitting 110 and/or, more generally, the composite rib 100 to the lower skin panel 404 of the aircraft wing 300. As further shown in FIG. 4, an example retaining nut 422 is configured to threadably engage the second bolt 420 to couple the second metallic fitting 110 to the lower skin panel 404 of the aircraft wing 300.

The first (e.g., upper) fasteners 112 and the second (e.g., lower) fasteners 114 can be implemented by and/or as any suitable type of threaded, partially-threaded, and/or unthreaded fastener including, for example, bolts, screws, and/or rivets. When the composite rib 100 of FIGS. 1-4 is in an assembled state (e.g., as shown in FIGS. 2-4), one or more of the first (e.g., upper) fastener(s) 112 extend(s) through a corresponding one or more of the through hole(s) 180 of the first metallic fittings 108, through a corresponding one or more of the first (e.g., upper) through hole(s) 172 of the metallic grounding plate 106, through a corresponding one or more of the first (e.g., upper) through hole(s) 140 of the CFRP panel 102, and through a corresponding one or more of the first (e.g., upper) through holes 152 of the hat stiffeners 104, thereby coupling together the first metallic fittings 108, the metallic grounding plate 106, the CFRP panel 102, and the hat stiffeners 104. Similarly, one or more of the second (e.g., lower) fasteners 114 extend(s) through a corresponding one or more of the first through hole(s) 186 of the second metallic fittings 110, through a corresponding one or more of the second (e.g., lower) through hole(s) 174 of the metallic grounding plate 106, through a corresponding one or more of the second (e.g., lower) through hole(s) 142 of the CFRP panel 102, and through a corresponding one or more of the second (e.g., lower) through holes 154 of the hat stiffeners 104, thereby coupling together the second metallic fittings 110, the metallic grounding plate 106, the CFRP panel 102, and the hat stiffeners 104.

In the illustrated example of FIGS. 1-4, the first metallic fittings 108 are configured to couple the composite rib 100 to the upper skin panel 402 of the aircraft wing 300, and the second metallic fittings 110 are configured to couple the composite rib 100 to the lower skin panel 404 of the aircraft wing 300. In other examples, this orientation can be reversed, with the first metallic fittings 108 being configured to couple the composite rib 100 to the lower skin panel 404 of the aircraft wing 300, and the second metallic fittings 110 being configured to couple the composite rib 100 to the upper skin panel 402 of the aircraft wing 300. In still other examples, one or more of the second metallic fitting(s) 110 shown in FIGS. 1-4 can be omitted in favor of one or more alternate metallic fitting(s) structured and/or configured, for example, in a manner similar to the first metallic fittings 108 of FIGS. 1-5. In still other examples, one or more of the first metallic fitting(s) 108 shown in FIGS. 1-5 can be omitted in favor of one or more alternate metallic fitting(s) structured and/or configured, for example, in a manner similar to the second metallic fittings 110 of FIGS. 1-4.

In the illustrated example of FIGS. 1-4, respective ones of the first (e.g., upper) metallic fittings 108 are paired and/or vertically aligned with corresponding respective ones of the second (e.g., lower) metallic fittings 110. For example, the first metallic fittings 108 of FIGS. 1-4 include an example first upper metallic fitting 188 and an example second upper metallic fitting 190 that is laterally spaced apart from the first upper metallic fitting 188. The second metallic fittings 110 of FIGS. 1-4 include an example first lower metallic fitting 192 and an example second lower metallic fitting 194 that is laterally spaced apart from the first lower metallic fitting 192. The first upper metallic fitting 188 is paired and/or vertically aligned with the first lower metallic fitting 192. Similarly, the second upper metallic fitting 190 is paired and/or vertically aligned with the second lower metallic fitting 194. Pairing and/or vertically aligning respective ones of the first metallic fittings 108 with corresponding respective ones of the second metallic fittings 110 advantageously enables the paired ones of the first and second metallic fittings 108, 110 to be coupled to a single and/or a same corresponding one of the hat stiffeners 104 of the composite rib 100. For example, as shown in FIG. 4, the first upper metallic fitting 188 and the first lower metallic fitting 192 are commonly coupled to an example first hat stiffener 196 from among the hat stiffeners 104 of the composite rib 100 of FIGS. 1-4. Similarly, the second upper metallic fitting 190 and the second lower metallic fitting 194 can commonly be coupled to an example second hat stiffener 198 from among the hat stiffeners 104 of the composite rib of FIGS. 1-4.

In the illustrated example of FIG. 3, the composite rib 100 is shown in an assembled state and coupled to the front spar 302 and the rear spar 304 of the aircraft wing 300. The first metallic rib post 306 couples the composite rib 100 to the front spar 302, and the second metallic rib post 308 coupled the composite rib 100 to the rear spar 304. Example first CRN cables 310 are carried by, coupled to, and/or mounted on the front spar 302, and example second CRN cables 312 are carried by, coupled to, and/or mounted on the rear spar 304. The first and/or second CRN cables 310, 312 can lead to and/or be operatively coupled to one or more discharge probe(s) of the aircraft wing 300 that facilitate dissipating and/or discharging electrical current and/or electrostatic charge into the atmosphere.

The first metallic rib post 306 of FIG. 3 is coupled (e.g., bolted, riveted, etc.) to the CFRP panel 102 of the composite rib 100 at the first end 120 of the CFRP panel 102. The second metallic rib post 308 of FIG. 3 is coupled (e.g., bolted, riveted, etc.) to the CFRP panel 102 of the composite rib 100 at the second end 122 of the CFRP panel 102. When the composite rib 100 is coupled to the first and second metallic rib posts 306, 308 as shown in FIG. 3, the border 168 and/or, more generally, the metallic grounding plate 106 contacts the first and second metallic fittings 108, 110 and further contacts the first and second metallic rib posts 306, 308, thereby advantageously providing one or more electrical grounding paths passing from the first and/or second metallic fittings 108, 110 to the first and/or second metallic rib posts 306, 308 of the composite rib 100.

In the illustrated example of FIG. 3, the border 168 and/or, more generally, the metallic grounding plate 106 provides an example first electrical grounding path 314 that extends from one or more of the first metallic fittings 108 to the first and/or second metallic rib posts 306, 308. The border 168 and/or, more generally, the metallic grounding plate 106 further provides an example second electrical grounding path 316 that extends from one or more of the second metallic fittings 110 to the first and/or second metallic rib posts 306, 308. As shown in FIG. 3, the border 168 of the metallic grounding plate 106 connects the first and second electrical grounding paths 314, 316 to one another.

Electrical current (e.g., lightning current from a lightning strike) and/or electrostatic charge can be received at the first and/or second metallic fittings 108, 110 of the composite rib 100 from the first and/or second skin panels 402, 404 of the aircraft wing 300. The first and/or second electrical grounding paths 314, 316 of FIG. 3 can carry and/or pass the received electrical current and/or electrostatic charge from the first and/or second metallic fittings 108, 110 of the composite rib 100 to the first and/or second metallic rib posts 306, 308 of the composite rib 100. Electrical current and/or electrostatic charge received at the first metallic rib post 306 passes from the first metallic rib post 306 through the front spar 302 to the first CRN cables 310. Electrical current and/or electrostatic charge received at the second metallic rib post 308 passes from the second metallic rib post 308 through the rear spar 304 to the second CRN cables 312. The first and/or second CRN cables 310, 312 carry and/or pass the received electrical current and/or electrostatic charge to one or more discharge probe(s) of the aircraft wing 300 that facilitate dissipating and/or discharging electrical current and/or electrostatic charge into the atmosphere. Thus, the first and second electrical grounding paths 314, 316 of the composite rib 100 advantageously assist in carrying, passing and/or transferring electrical current and/or electrostatic charge away from the composite rib 100 and into the atmosphere.

In the illustrated example of FIG. 4, the composite rib 100 is shown in an assembled state and coupled to the upper skin panel 402 and the lower skin panel 404 of the aircraft wing 300. The hat stiffener 104 is coupled to the CFRP panel 102. The flanges 148 of the hat stiffener 104 contact the first surface 116 of the CFRP panel 102. The metallic grounding plate 106 is coupled to the CFRP panel 102. The first surface 156 of the metallic grounding plate 106 contacts the second surface 118 of the CFRP panel 102. The first (e.g., upper) metallic fitting 108 is coupled to the CFRP panel 102. The plate portion 176 of the first metallic fitting 108 contacts the second surface 158 of the metallic grounding plate 106. The second (e.g., lower) metallic fitting 110 is coupled to the CFRP panel 102. The plate portion 182 of the second metallic fitting 110 contacts the second surface 158 of the metallic grounding plate 106. The first (e.g., upper) fasteners 112 extend through the plate portion 176 of the first metallic fitting 108, through the metallic grounding plate 106, through the CFRP panel 102, and through one of the flanges 148 of the hat stiffener 104. The second (e.g., lower) fasteners 114 extend through the plate portion 182 of the second metallic fitting 110, through the metallic grounding plate 106, through the CFRP panel 102, and through one of the flanges 148 of the hat stiffener 104.

In the illustrated example of FIG. 4, the assembled composite rib 100 is coupled to the upper skin panel 402 of the aircraft wing 300 via the first (e.g., upper) metallic fitting 108, and coupled to the lower skin panel 404 of the aircraft wing 300 via the second (e.g., lower) metallic fitting 110. The coupling of the assembled composite rib 100 to the upper skin panel 402 of the aircraft wing 300 via the first metallic fitting 108 is provided in part by a threaded engagement between the first bolt 408 and the barrel nut 414. The coupling of the assembled composite rib 100 to the lower skin panel 404 of the aircraft wing 300 via the second metallic fitting 110 is provided in part by a threaded engagement between the second bolt 420 and the retaining nut 422.

Electrical current (e.g., lightning current) and/or electrostatic charge applied to the upper skin panel 402 of the aircraft wing 300 is transferred from the upper skin panel 402 to the first (e.g., upper) metallic fittings 108 of the composite rib 100, from the first metallic fittings 108 through the metallic grounding plate 106 (e.g., via the first electrical grounding path 314 of FIG. 3) to the first and/or second metallic rib posts 306, 308, and from the first and/or second metallic rib posts 306, 308 through the front and/or rear spars 302, 304 to the first and/or second CRN cables 310, 312. Electrical current and/or electrostatic charge applied to the lower skin panel 404 of the aircraft wing 300 is transferred from the lower skin panel 404 to the second (e.g., lower) metallic fittings 110 of the composite rib 100, from the second metallic fittings 110 through the metallic grounding plate 106 (e.g., via the second electrical grounding path 316 of FIG. 3) to the first and/or second metallic rib posts 306, 308, and from the first and/or second metallic rib posts 306, 308 through the front and/or rear spars 302, 304 to the first and/or second CRN cables 310, 312. The first and/or second CRN cables 310, 312 carry and/or pass the received electrical current and/or electrostatic charge to one or more discharge probe(s) of the aircraft wing 300 that facilitate dissipating and/or discharging electrical current and/or electrostatic charge into the atmosphere.

Figure 6:
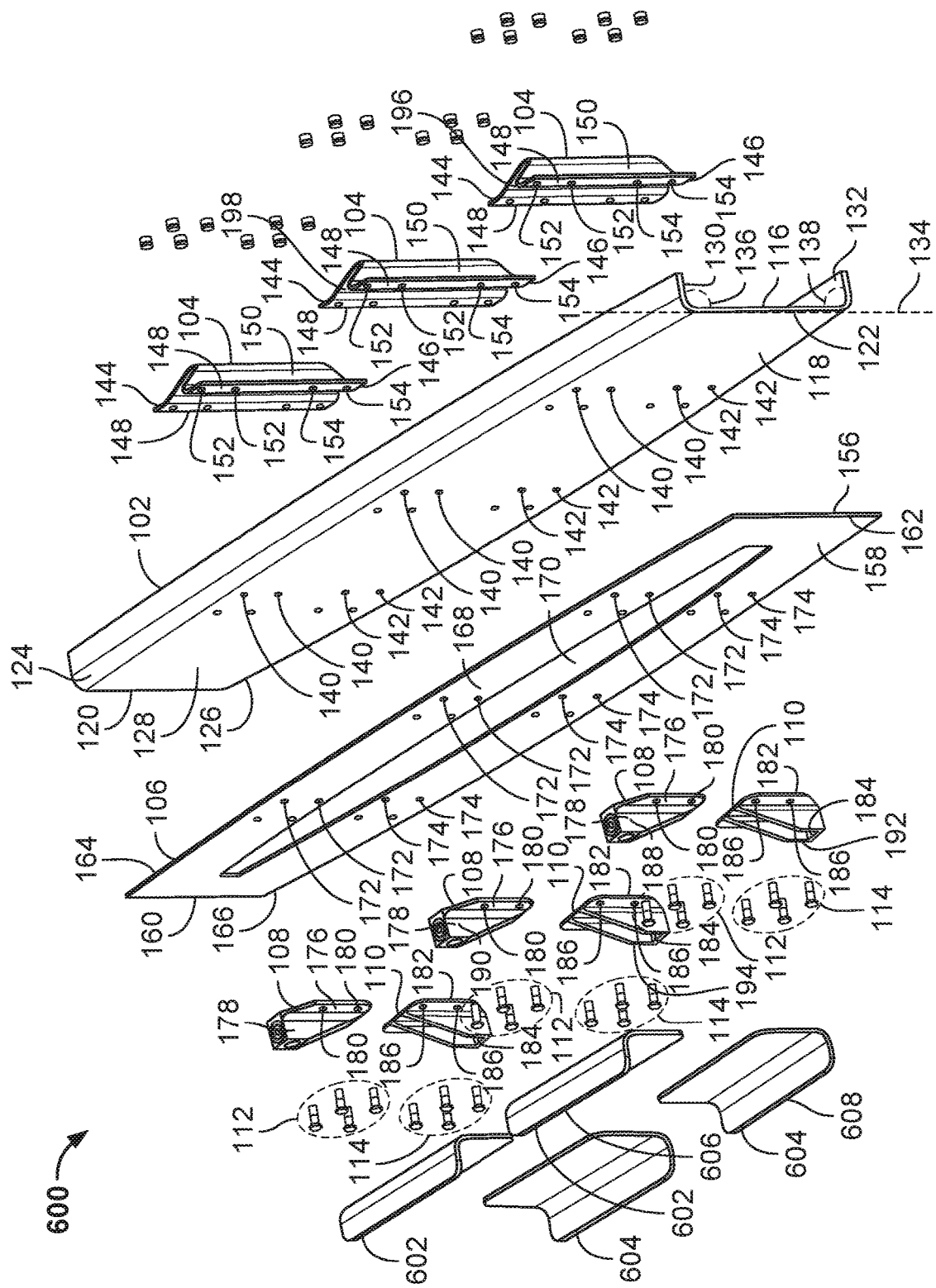
FIG. 6 is an exploded view of an example alternate composite rib constructed in accordance with teachings of this disclosure.
Figure 7:
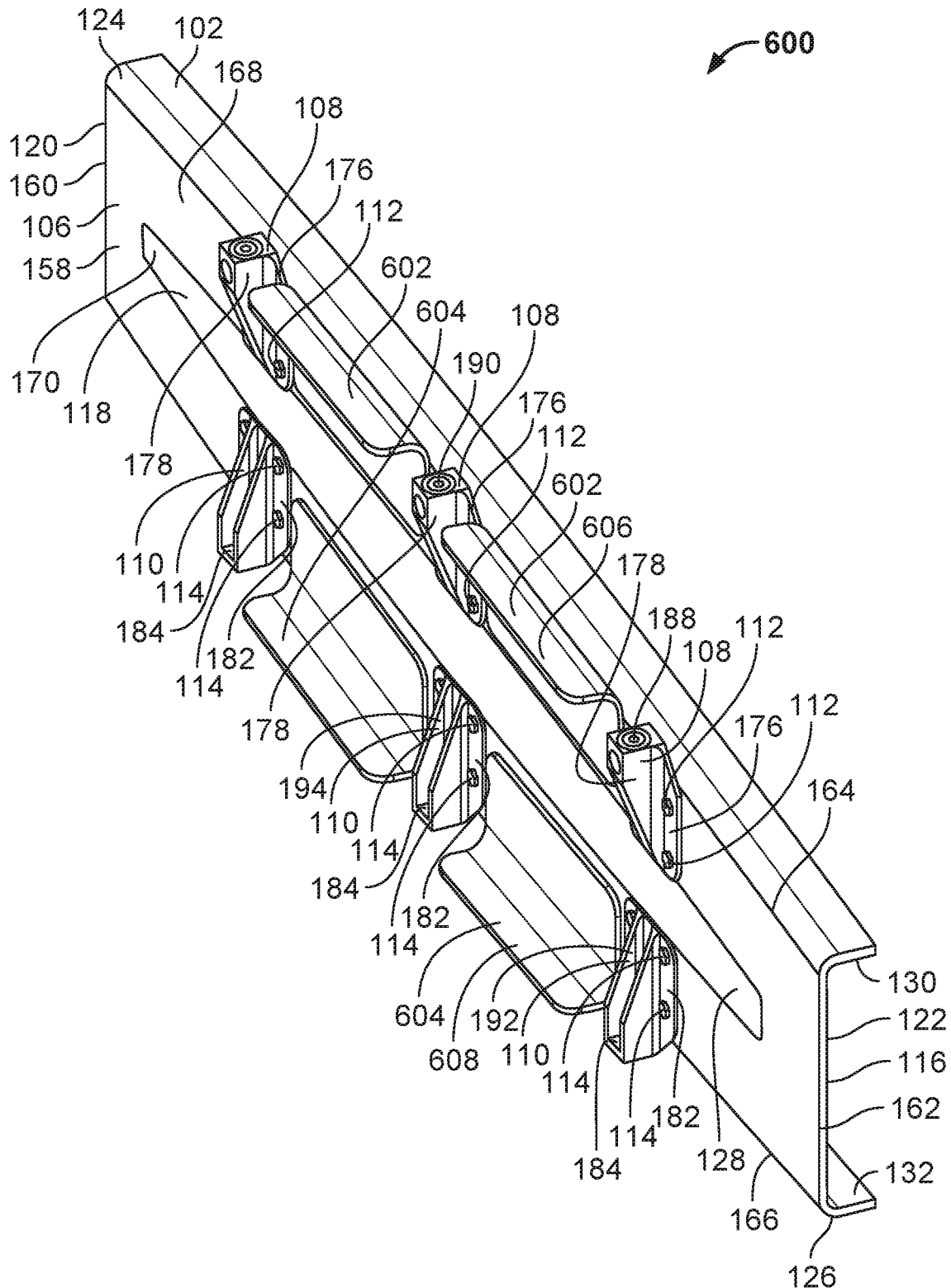
FIG. 7 is a perspective view of the example alternate composite rib of FIG. 6 in an assembled state.

FIG. 6 is an exploded view of an example alternate composite rib 600 constructed in accordance with teachings of this disclosure. FIG. 7 is a perspective view of the example alternate composite rib 600 of FIG. 6 in an assembled state. The alternate composite rib 600 of FIGS. 6 and 7 includes the CFRP panel 102, the hat stiffeners 104, the metallic grounding plate 106, the first (e.g., upper) metallic fittings 108, the second (e.g., lower) metallic fittings 110, the first (e.g., upper) fasteners 112, and the second (e.g., lower) fasteners 114 of the composite rib 100 of FIGS. 1-5 described above. The alternate composite rib 600 of FIGS. 6 and 7 can be coupled to the front and rear spars 302, 304 of the aircraft wing 300 of FIG. 3 via corresponding ones of the first and second metallic rib posts 306, 308 of FIG. 3 in the same manner as the composite rib 100 of FIGS. 1-4 is coupled to the front and rear spars 302, 304 of the aircraft wing 300 of FIG. 3 via corresponding ones of the first and second metallic rib posts 306, 308 of FIG. 3, as described above. Moreover, the alternate composite rib 600 of FIGS. 6 and 7 can be coupled to the upper skin panel 402 and the lower skin panel 404 of the aircraft wing 300 of FIG. 4 in the same manner as the composite rib 100 of FIGS. 1-4 is coupled to the upper skin panel 402 and the lower skin panel 404 of the aircraft wing 300 of FIG. 4, as described above.

In addition to the above-identified components and/or parts, the alternate composite rib 600 of FIGS. 6 and 7 further includes example first (e.g., upper) shear ties 602 and example second (e.g., lower) shear ties 604. In the illustrated example of FIGS. 6 and 7, the alternate composite rib 600 includes two (2) first shear ties 602, and two (2) second shear ties 604. In other examples, the alternate composite rib 600 can include a different number (e.g., 0, 1, 3, etc.) of first shear ties 602, and/or a different number (e.g., 0, 1, 3, etc.) of second shear ties 604. The first and second shear ties 602, 604 of FIGS. 6 and 7 are structural and/or load-bearing members of the alternate composite rib 600. In some examples, the first and second shear ties 602, 604 can be CFRP shear ties, and can accordingly be made from the same material as the CFRP panel 102 of the alternate composite rib 600. In other examples, one or more of the first and second shear ties 602, 604 can alternatively be made from a material other than CFRP including, for example, a different plastic material and/or a metal material.

Respective ones of the first (e.g., upper) shear ties 602 are configured to be coupled to the metallic grounding plate 106 between neighboring ones of the first (e.g., upper) metallic fittings 108 of the alternate composite rib 600. Similarly, respective ones of the second (e.g., lower) shear ties 604 are configured to be coupled to the metallic grounding plate 106 between neighboring ones of the second (e.g., lower) metallic fittings 110 of the alternate composite rib 600. For example, as shown in FIG. 7, an example first upper shear tie 606 from among the first (e.g., upper) shear ties 602 is coupled (e.g., bonded) to the second surface 158 of the metallic grounding plate 106 at a location between the first upper metallic fitting 188 and the second upper metallic fitting 190 from among the first (e.g., upper) metallic fittings 108 of the alternate composite rib 600. As further shown in FIG. 7, an example first lower shear tie 608 from among the second (e.g., lower) shear ties 604 is coupled (e.g., bonded) to the second surface 158 of the metallic grounding plate 106 at a location between the first lower metallic fitting 192 and the second lower metallic fitting 194 from among the second (e.g., lower) metallic fittings 110 of the alternate composite rib 600. The first and second shear ties 602, 604 of the alternate composite rib 600 of FIGS. 6 and 7 advantageously enhance the overall stability of the alternate composite rib 600 relative to that of the composite rib 100 of FIGS. 1-4 without compromising and/or impeding the benefits provided by the first and second electrical grounding paths 514, 516, which remains fully-operable in the alternate composite rib 600.

From the foregoing, it will be appreciated that example aircraft wing composite ribs having electrical grounding paths have been disclosed. The disclosed composite ribs advantageously include a CFRP panel, a metallic rib post, a metallic fitting, and a metallic grounding member (e.g., a metallic grounding plate or a metallic grounding cable). The metallic rib post is coupled to the CFRP panel and is configured to be coupled to a spar of an aircraft wing, the spar being coupled to a CRN cable. The metallic fitting is coupled to the CFRP panel and is configured to be coupled to a skin panel of the aircraft wing. The metallic grounding member is positioned between the CFRP panel and the metallic fitting, thereby advantageously providing an electrical grounding path that extends from the metallic fitting to the metallic rib post. The electrical grounding path enables electrical current and/or electrostatic charge to pass from the metallic fitting to the metallic rib post. The electrical current and/or electrostatic charge can thereafter pass from the metallic rib post through the spar to the CRN cable, thereby allowing for such electrical current and/or electrostatic charge to be carried and/or dissipated away from the composite rib and into the atmosphere. The electrical grounding path formed by the metallic grounding member of the example aircraft wing composite ribs disclosed herein provides enhanced and/or improved lightning strike protection without compromising and/or impeding the above-described benefits associated with implementing a composite rib having a CFRP panel in lieu of a corresponding metallic (e.g., aluminum) panel.

In some examples, a composite rib is disclosed. In some disclosed examples, the composite rib comprises a CFRP panel. In some disclosed examples, the composite rib further comprises a metallic rib post coupled to the CFRP panel and configured to be coupled to a spar of an aircraft wing. In some disclosed examples, the spar is coupled to a CRN cable. In some disclosed examples, the composite rib further comprises a metallic fitting coupled to the CFRP panel and configured to be coupled to a skin panel of the aircraft wing. In some disclosed examples, the composite rib further comprises a metallic grounding member positioned between the CFRP panel and the metallic fitting. In some disclosed examples, the metallic grounding member provides an electrical grounding path extending from the metallic fitting to the metallic rib post.

In some disclosed examples, the electrical grounding path is configured to carry lightning current from the metallic fitting to the metallic rib post. In some disclosed examples, the lightning current is to be received at the metallic fitting from the skin panel, to pass through the electrical grounding path, and to pass from the metallic rib post through the spar to the CRN cable.

In some disclosed examples, the electrical grounding path is configured to carry electrostatic charge from the metallic fitting to the metallic rib post. In some disclosed examples, the electrostatic charge is to be received at the metallic fitting from the skin panel, to pass through the electrical grounding path, and to pass from the metallic rib post through the spar to the CRN cable.

In some disclosed examples, the metallic grounding member is a non-structural member.

In some disclosed examples, the metallic fitting is a first metallic fitting, the skin panel is an upper skin panel, and the electrical grounding path is a first electrical grounding path. In some disclosed examples, the composite rib further comprises a second metallic fitting coupled to the CFRP panel and configured to be coupled to a lower skin panel of the aircraft wing. In some disclosed examples, the metallic grounding member is further positioned between the CFRP panel and the second metallic fitting. In some disclosed examples, the metallic grounding member provides a second electrical grounding path extending from the second metallic fitting to the metallic rib post.

In some disclosed examples, the metallic grounding member is a metallic grounding plate.

In some disclosed examples, the metallic grounding plate includes a border and an opening surrounded by the border. In some disclosed examples, the opening is located between the first and second metallic fittings. In some disclosed examples, the first and second metallic fittings contact the border. In some disclosed examples, the border connects the first and second electrical grounding paths.

In some disclosed examples, the metallic grounding plate includes a first surface and a second surface located opposite the first surface. In some disclosed examples, the first surface contacts the CFRP panel. In some disclosed examples, the second surface contacts the first and second metallic fittings.

In some disclosed examples, the composite rib further comprises a hat stiffener coupled to the CFRP panel.

In some disclosed examples, the CFRP panel includes a first surface and a second surface located opposite the first surface. In some disclosed examples, the hat stiffener contacts the first surface of the CFRP panel, and the metallic grounding plate contacts the second surface of the CFRP panel.

In some disclosed examples, the hat stiffener is bonded to the first surface of the CFRP panel. In some disclosed examples, the metallic grounding plate is bonded to the second surface of the CFRP panel.

In some disclosed examples, the CFRP panel further includes a central segment defining a plane, a first flange extending away from the central segment at a first angle relative to the plane, and a second flange extending away from the central segment at a second angle relative to the plane. In some disclosed examples, the hat stiffener is located between the first flange and the second flange.

In some disclosed examples, the composite rib further comprises a first fastener extending through the first metallic fitting, the metallic grounding plate, the CFRP panel, and the hat stiffener. In some disclosed examples, the composite rib further comprises a second fastener extending through the second metallic fitting, the metallic grounding plate, the CFRP panel, and the hat stiffener.

In some disclosed examples, the first metallic fitting is a first upper metallic fitting and the second metallic fitting is a first lower metallic fitting. In some disclosed examples, the composite rib further comprises a second upper metallic fitting coupled to the CFRP panel and configured to be coupled to the upper skin panel, the second upper metallic fitting being spaced apart from the first upper metallic fitting. In some disclosed examples, the composite rib further comprises a second lower metallic fitting coupled to the CFRP panel and configured to be coupled to the lower skin panel, the second lower metallic fitting being spaced apart from the first lower metallic fitting. In some disclosed examples, the composite rib further comprises a first shear tie coupled to the metallic grounding plate at a location between the first and second upper metallic fittings. In some disclosed examples, the composite rib further comprises a second shear tie coupled to the metallic grounding plate at a location between the first and second lower metallic fittings.

In some examples, a method for assembling a composite rib is disclosed. In some disclosed examples, the method comprises coupling a metallic grounding member to a CFRP panel. In some disclosed examples, the method further comprises coupling a metallic rib post to the CFRP panel. In some disclosed examples, the metallic rib post is configured to be coupled to a spar of an aircraft wing. In some disclosed examples, the spar is coupled to a CRN cable. In some disclosed examples, the method further comprises coupling a metallic fitting to the CFRP panel. In some disclosed examples, the metallic fitting is configured to be coupled to a skin panel of the aircraft wing. In some disclosed examples of the method, the metallic grounding member is positioned between the CFRP panel and the metallic fitting, and the metallic grounding member provides an electrical grounding path extending from the metallic fitting to the metallic rib post.

In some disclosed examples, the metallic fitting is a first metallic fitting, the skin panel is an upper skin panel, and the electrical grounding path is a first electrical grounding path. In some disclosed examples, the method further comprises coupling a second metallic fitting to the CFRP panel. In some disclosed examples, the second metallic fitting is configured to be coupled to a lower skin panel of the aircraft wing. In some disclosed examples, the metallic grounding member is further positioned between the CFRP panel and the second metallic fitting, and the metallic grounding member provides a second electrical grounding path extending from the second metallic fitting to the metallic rib post.

In some disclosed examples, the metallic grounding member is a metallic grounding plate.

In some disclosed examples, the metallic grounding plate includes a border and an opening surrounded by the border. In some disclosed examples, the opening is located between the first and second metallic fittings. In some disclosed examples, the first and second metallic fittings contact the border. In some disclosed examples, the border connects the first and second electrical grounding paths.

In some disclosed examples, the method further comprises coupling a hat stiffener to the CFRP panel.

In some disclosed examples, the CFRP panel includes a first surface and a second surface located opposite the first surface. In some disclosed examples, the hat stiffener contacts the first surface of the CFRP panel, and the metallic grounding plate contacts the second surface of the CFRP panel.

In some disclosed examples, the coupling the hat stiffener to the CFRP panel includes bonding the hat stiffener to the first surface of the CFRP panel. In some disclosed examples, the coupling the metallic grounding plate to the CFRP panel includes bonding the metallic grounding plate to the second surface of the CFRP panel.

In some disclosed examples, the coupling the first metallic fitting to the CFRP panel includes extending a first fastener through the first metallic fitting, the metallic grounding plate, the CFRP panel, and the hat stiffener. In some disclosed examples, the coupling the second metallic fitting to the CFRP panel includes extending a second fastener through the second metallic fitting, the metallic grounding plate, the CFRP panel, and the hat stiffener.

In some examples, a metallic fitting configured to couple a composite rib to a skin panel of an aircraft wing is disclosed. In some disclosed examples, the metallic fitting comprises a through hole configured to receive a fastener, the fastener configured to couple the metallic fitting to the composite rib. In some disclosed examples, the metallic fitting further comprises a bore configured to receive a bolt. In some disclosed examples, the metallic fitting further comprises a cavity intersecting the bore, the cavity having an access opening. In some disclosed examples, the metallic fitting further comprises a barrel nut located within the cavity, the barrel nut configured to threadably engage the bolt to couple the metallic fitting to the skin panel. In some disclosed examples, the metallic fitting further comprises a seal located within the cavity, the seal configured to close the access opening.

In some disclosed examples, the through hole is orthogonal to the bore.

In some disclosed examples, the metallic fitting further comprises a plate portion and a rib portion extending away from the plate portion.

In some disclosed examples, the through hole is formed in the plate portion.

In some disclosed examples, the bore is formed in the rib portion. In some disclosed examples, the bore does not extend fully through the rib portion.

In some disclosed examples, the cavity is formed in the rib portion. In some disclosed examples, the cavity does not extend fully through the rib portion.

In some disclosed examples, the seal is configured to prevent sparks from passing out of the cavity through the access opening.

In some disclosed examples, the seal is configured to interface with fuel contained within the aircraft wing.

In some examples, a method for coupling a composite rib to a skin panel of an aircraft wing via a metallic fitting is disclosed. In some disclosed examples, the method comprises extending a fastener through a through hole of the metallic fitting to couple the metallic fitting to the composite rib. In some disclosed examples, the method further comprises extending a bolt into a bore of the metallic fitting to couple the metallic fitting to the skin panel. In some disclosed examples, the bolt threadably engages a barrel nut located within a cavity of the metallic fitting. In some disclosed examples, the cavity intersects the bore and has an access opening. In some disclosed examples, the access opening is closed by a seal located within the cavity.

In some disclosed examples of the method, the through hole is orthogonal to the bore.

In some disclosed examples of the method, the metallic fitting includes a plate portion and a rib portion extending away from the plate portion.

In some disclosed examples of the method, the through hole is formed in the plate portion.

In some disclosed examples of the method, the bore is formed in the rib portion. In some disclosed examples, the bore does not extend fully through the rib portion.

In some disclosed examples of the method, the cavity is formed in the rib portion. In some disclosed examples, the cavity does not extend fully through the rib portion.

In some disclosed examples of the method, the seal is configured to prevent sparks from passing out of the cavity through the access opening.

In some disclosed examples of the method, the seal is configured to interface with fuel contained within the aircraft wing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A composite rib, comprising:
   a carbon fiber reinforced plastic (CFRP) panel;
   a metallic rib post coupled to the CFRP panel and configured to be coupled to a spar of an aircraft wing, the spar coupled to a current return network (CRN) cable;
   a metallic fitting coupled to the CFRP panel and configured to be coupled to a skin panel of the aircraft wing; and
   a metallic grounding member positioned between the CFRP panel and the metallic fitting, the metallic grounding member providing an electrical grounding path extending from the metallic fitting to the metallic rib post.

2. The composite rib of claim 1, wherein the electrical grounding path is configured to carry lightning current from the metallic fitting to the metallic rib post, the lightning current to be received at the metallic fitting from the skin panel, to pass through the electrical grounding path, and to pass from the metallic rib post through the spar to the CRN cable.

3. The composite rib of claim 1, wherein the electrical grounding path is configured to carry electrostatic charge from the metallic fitting to the metallic rib post, the electrostatic charge to be received at the metallic fitting from the skin panel, to pass through the electrical grounding path, and to pass from the metallic rib post through the spar to the CRN cable.

4. The composite rib of claim 1, wherein the metallic grounding member is a non-structural member.

5. The composite rib of claim 1, wherein the metallic fitting is a first metallic fitting, the skin panel is an upper skin panel, and the electrical grounding path is a first electrical grounding path, wherein the composite rib further comprises a second metallic fitting coupled to the CFRP panel and configured to be coupled to a lower skin panel of the aircraft wing, and wherein the metallic grounding member is further positioned between the CFRP panel and the second metallic fitting, the metallic grounding member providing a second electrical grounding path extending from the second metallic fitting to the metallic rib post.

6. The composite rib of claim 5, wherein the metallic grounding member is a metallic grounding plate.

7. The composite rib of claim 6, wherein the metallic grounding plate includes a border and an opening surrounded by the border, the opening being located between the first and second metallic fittings, the first and second metallic fittings contacting the border, the border connecting the first and second electrical grounding paths.

8. The composite rib of claim 6, wherein the metallic grounding plate includes a first surface and a second surface located opposite the first surface, the first surface contacting the CFRP panel, the second surface contacting the first and second metallic fittings.

9. The composite rib of claim 6, further comprising a hat stiffener coupled to the CFRP panel.

10. The composite rib of claim 6, wherein the first metallic fitting is a first upper metallic fitting and the second metallic fitting is a first lower metallic fitting, the composite rib further comprising:
    a second upper metallic fitting coupled to the CFRP panel and configured to be coupled to the upper skin panel, the second upper metallic fitting being spaced apart from the first upper metallic fitting;
    a second lower metallic fitting coupled to the CFRP panel and configured to be coupled to the lower skin panel, the second lower metallic fitting being spaced apart from the first lower metallic fitting;
    a first shear tie coupled to the metallic grounding plate at a location between the first and second upper metallic fittings; and
    a second shear tie coupled to the metallic grounding plate at a location between the first and second lower metallic fittings.

11. The composite rib of claim 9, wherein the CFRP panel includes a first surface and a second surface located opposite the first surface, the hat stiffener contacting the first surface of the CFRP panel, the metallic grounding plate contacting the second surface of the CFRP panel.

12. The composite rib of claim 11, wherein the hat stiffener is bonded to the first surface of the CFRP panel, and the metallic grounding plate is bonded to the second surface of the CFRP panel.

13. The composite rib of claim 11, wherein the CFRP panel further includes a central segment defining a plane, a first flange extending away from the central segment at a first angle relative to the plane, and a second flange extending away from the central segment at a second angle relative to the plane, and wherein the hat stiffener is located between the first flange and the second flange.

14. The composite rib of claim 11, further comprising:
    a first fastener extending through the first metallic fitting, the metallic grounding plate, the CFRP panel, and the hat stiffener; and
    a second fastener extending through the second metallic fitting, the metallic grounding plate, the CFRP panel, and the hat stiffener.

15. A method for assembling a composite rib, the method comprising:
    coupling a metallic grounding member to a carbon fiber reinforced plastic (CFRP) panel;
    coupling a metallic rib post to the CFRP panel, the metallic rib post configured to be coupled to a spar of an aircraft wing, the spar coupled to a current return network (CRN) cable; and
    coupling a metallic fitting to the CFRP panel, the metallic fitting configured to be coupled to a skin panel of the aircraft wing;
    wherein the metallic grounding member is positioned between the CFRP panel and the metallic fitting, the metallic grounding member providing an electrical grounding path extending from the metallic fitting to the metallic rib post.

16. The method of claim 15, wherein the metallic fitting is a first metallic fitting, the skin panel is an upper skin panel, and the electrical grounding path is a first electrical grounding path, wherein the method further comprises coupling a second metallic fitting to the CFRP panel, the second metallic fitting configured to be coupled to a lower skin panel of the aircraft wing, and wherein the metallic grounding member is further positioned between the CFRP panel and the second metallic fitting, the metallic grounding member providing a second electrical grounding path extending from the second metallic fitting to the metallic rib post.

17. The method of claim 16, wherein the metallic grounding member is a metallic grounding plate.

18. The method of claim 17, wherein the metallic grounding plate includes a border and an opening surrounded by the border, the opening being located between the first and second metallic fittings, the first and second metallic fittings contacting the border, the border connecting the first and second electrical grounding paths.

19. The method of claim 17, further comprising coupling a hat stiffener to the CFRP panel.

20. The method of claim 19, wherein the CFRP panel includes a first surface and a second surface located opposite the first surface, the hat stiffener contacting the first surface of the CFRP panel, the metallic grounding plate contacting the second surface of the CFRP panel.

21. The method of claim 20, wherein the coupling the hat stiffener to the CFRP panel includes bonding the hat stiffener to the first surface of the CFRP panel, and wherein the coupling the metallic grounding plate to the CFRP panel includes bonding the metallic grounding plate to the second surface of the CFRP panel.

22. The method of claim 20, wherein the coupling the first metallic fitting to the CFRP panel includes extending a first fastener through the first metallic fitting, the metallic grounding plate, the CFRP panel, and the hat stiffener, and wherein the coupling the second metallic fitting to the CFRP panel includes extending a second fastener through the second metallic fitting, the metallic grounding plate, the CFRP panel, and the hat stiffener.

* * * * *